United States Patent
Chriss

(10) Patent No.: US 9,334,900 B2
(45) Date of Patent: May 10, 2016

(54) BALL BEARING CAGE

(75) Inventor: Aaron Chriss, Woodbury, CT (US)

(73) Assignee: Schaeffler Technologies AG & Co. KG, Herzogenaurach (*) Notice: Subject to any disclaimer, the term of this patent is extended or adjusted under 35 U.S.C. 154(b) by 1023 days.

(21) Appl. No.: 13/511,448

(22) PCT Filed: Nov. 26, 2010

(86) PCT No.: PCT/EP2010/068275
§ 371 (c)(1),
(2), (4) Date: May 23, 2012

(87) PCT Pub. No.: WO2011/067173
PCT Pub. Date: Jun. 9, 2011

(65) Prior Publication Data
US 2012/0281940 A1    Nov. 8, 2012

Related U.S. Application Data

(60) Provisional application No. 61/265,432, filed on Dec. 1, 2009.

(51) Int. Cl.
*F16C 33/38* (2006.01)
*F16C 19/18* (2006.01)

(52) U.S. Cl.
CPC ........... *F16C 33/3843* (2013.01); *F16C 19/184* (2013.01); *F16C 2240/30* (2013.01); *F16C 2360/24* (2013.01)

(58) Field of Classification Search
CPC ........................................................ F16C 33/38
See application file for complete search history.

(56) References Cited

U.S. PATENT DOCUMENTS

| | | | | |
|---|---|---|---|---|
| 2,711,938 A | * | 6/1955 | Herrmann | 384/572 |
| 3,918,778 A | * | 11/1975 | Jacobson et al. | 384/447 |
| 4,040,686 A | * | 8/1977 | F'Geppert | 384/527 |
| 6,102,822 A | * | 8/2000 | Nakazeki | 474/199 |
| 6,261,004 B1 | * | 7/2001 | Tsujimoto et al. | 384/571 |
| 6,692,156 B1 | * | 2/2004 | Ohura et al. | 384/523 |
| 2006/0018581 A1 | | 1/2006 | Buckman | |

FOREIGN PATENT DOCUMENTS

| | | |
|---|---|---|
| DE | 11 2004 002 481 T5 | 11/2006 |
| DE | 10 2006 030 836 A1 | 1/2008 |
| JP | 2006 105273 A | 4/2006 |
| WO | 2006/048052 A1 | 5/2006 |

* cited by examiner

*Primary Examiner* — Thomas R. Hannon
(74) *Attorney, Agent, or Firm* — Davidson, Davidson & Kappel, LLC

(57) ABSTRACT

A ball bearing cage with an annular rolling element retaining body, which has ball sockets distributed around a circumference of the rolling element retaining body for receiving spherical rolling elements. The ball sockets are distributed around the circumference, such that distances between two adjacent ball sockets increase in a circumferential direction, starting at a smallest distance between two adjacent sockets at least in a circumferential sector.

13 Claims, 2 Drawing Sheets

BALL BEARING CAGE

CROSS-REFERENCE TO RELATED APPLICATIONS

This application is a 371 of PCT/EP2010/068275 filed Nov. 26, 2010, which in turn claims the priority of U.S. Provisional Patent Application No. 61/265,432 filed Dec. 1, 2009. The priority of both applications is hereby claimed and both applications are incorporated by reference herein.

FIELD OF THE INVENTION

The invention lies in the field of high-power rolling bearings, in particular for the mounting of shafts revolving at high speed, as are used, for example, in turbochargers, but also in power plants or in high-speed turbines, for example gas turbines, for the mounting of the shafts there.

BACKGROUND OF THE INVENTION

DE 11 2004 002 481 T5 discloses a turbocharger of this type with a high-power rolling bearing, an angular ball bearing. Said turbocharger has a turbine wheel which drives a compressor wheel of the turbocharger via a rotatably mounted shaft. According to DE 11 2004 002 481 T5, said high-speed shaft is mounted via two angular ball bearings which support the shaft in relation to a positionally fixed housing.

Ball bearings, for example angular ball bearings or deep-groove ball bearings, are sufficiently known and generally have an inner ring, an outer ring and rolling bodies or balls arranged in a circumferential direction between the inner ring and the outer ring. The balls are kept at a distance distributed uniformly over the circumference using a ball bearing cage.

Ball bearing cages of various designs, for example sheet-metal cages or solid cages, made of various materials, for example sheet steel, brass, light metal, sintered iron, fabric-reinforced laminate, and of different structural forms, for example window cages, snap-type cages or a riveted cage, are also known.

In particular in the case of ball bearings of high-speed shafts, for example turbine shafts, cage instabilities occur, i.e. the cages of high-speed ball bearings of this type are excited, which leads to juddering, vibrations, erratic or chaotic movements of the cage, and/or to shock-like loading on cage run-up surfaces. This effect is reinforced in particular in the event of excitations in a resonance range of the cage. As a further consequence, these effects may lead to overheating of the ball bearing, decomposition of the lubricant or even to destruction of the ball bearing. Cage instabilities of this type are usually also accompanied by increased abnormal bearing noises.

JP 2006105273 A discloses a ball bearing with "asymmetrically" arranged balls. In said "asymmetrical ball bearing," which is intended to contribute to a reduction in the vibration and noise of the ball bearing, the balls are distributed asymmetrically over the circumference of the ball bearing in such a manner that two different distances between in each case two adjacent balls are formed in the circumferential direction of the ball bearing. In this case, a first large ball distance (RL) is one and a half times as large as a second small ball distance (RS), or RL=3/2*RS.

SUMMARY OF THE INVENTION

Against this background, it is the object of the present invention to provide a ball bearing which overcomes the abovementioned disadvantages and can be produced in a structurally simple and cost-effective manner.

This object is achieved according to the invention by a ball bearing cage which has an annular rolling body retainer that has ball pockets distributed over a circumference of the rolling body retainer in order to receive spherical rolling bodies. According to the invention, the ball pockets are distributed over the circumference in such a manner that distances between two adjacent ball pockets increase in a circumferential direction, starting at a smallest distance between two adjacent pockets at least in a circumferential sector.

The invention is based on the idea that the "asymmetrical" distribution of the pockets over the circumference of the cage results in a specific asymmetrical mass distribution at the cage and therefore in a specific and controlled eccentricity and unbalance of the cage. Also associated therewith is a shifting of the mass center line of the cage in such a manner that said mass center line deviates from the geometrical center line of the cage.

This controlled eccentricity of the cage generates a defined force, which opposes the above described cage instabilities, in the revolving movement of the cage. During its revolving movement, the cage is positioned in a specific manner on the run-up surface and thereby avoids the shock-like loading on the run-up surface; the resonance range of the cage is displaced towards frequencies outside the range of customary excitation frequencies and therefore prevents rocking of the cage during operation.

In association with the specific shifting of the mass in the cage, which is unchanged in the original configuration thereof, for example diameter, width—is the fact that this can be undertaken without additional introduction of mass in the cage. Even with the asymmetrical distribution according to the invention of the pockets, the weight of the cage remains overall unchanged.

Furthermore, it is also advantageous that the asymmetrical distribution of the pockets can be mass produced during production of the cages. Large series of such cages according to the invention can be manufactured at identical or at approximately comparable costs if there is no need for any complicated and costly production or processing of individual parts in the invention. In particular, the invention no longer requires any customary finishing work to compensate for unbalance ("balancing"), which saves on costs.

It is furthermore advantageous in the invention that transport damage can be reduced with ball bearings. If bearings are transported, in particular over relatively large distances, and are exposed during transport, in particular to shock-like loading, "impressions" of the rolling bodies or ridges may be formed in the raceways of the rolling bearings, in particular because, given a symmetrical arrangement of the pockets or symmetrical distribution of the rolling bodies, the latter are always located at an identical or identically offset position with respect to the raceways. The asymmetrical arrangement of the pockets or the asymmetrical distribution of the rolling bodies counters this effect. The rolling bodies are always located at a different position with respect to the raceways and can thus oppose the formation of an impression.

Diverse possibilities can be provided in order to specify or dimension the distance between two pockets. For example, the pocket distance between two adjacent pockets can be dimensioned by means of an angle which is formed through the center point of rotation of the cage in conjunction in each case with a cage center of the two adjacent pockets. In other words, the pocket distance is specified here by means of the circumferential angle enclosed between the two pocket centers.

Furthermore, dimensioning would be possible by indicating the length with respect to the circumference of the cage. Such a dimensioning could be specified with regard to the center points of two adjacent pockets. Indicating the length of a web (web width) separating two pockets in each case is also possible here.

Preferred developments of the invention emerge from the dependent claims.

In a preferred development, provision may be made for at least some of the distances in the circumferential sector to increase at an identical absolute amount. For example, if the pocket distance is dimensioned in accordance with the enclosed circumferential angle, it would be possible to make provision here for the pocket distances to increase in each case by a certain angle, for example 1°, 2° or 3°, in general y° (linear increase), thus, for example, in general, the first distance x°, the second distance (x+3)°, the third distance (x+2*y)°, the fourth distance (x+3*y)°, or specifically, the first distance x°, the second distance (x+1)°, the third distance (x+2)°, the fourth distance (x+3)°. A progressive increase in the pocket distances is also conceivable, for example first distance x°, second distance (x+1)°, third distance (x+3)°, fourth distance (x+6)°. Mixed forms are also possible, for example first distance x°, second distance (x+1)°, third distance (x+2)°, fourth distance (x+2)°.

In a further development, provision may be made for the ball pockets to be distributed over the circumference in such a manner that the ball bearing cage is axially symmetrical with respect to an axis through a center point of rotation of the ball bearing cage. In this case, a circumferential sector of 180° would be provided.

Provision may also be made as a development with the distances between, in each case, two adjacent ball pockets also to increase in an opposed circumferential direction, arranged counter to the circumferential direction, starting at a smallest distance between two adjacent ball pockets at least in a further circumferential sector.

In a further preferred refinement, provision may be made for there to be at least six, in particular eight, ball pockets and/or for there to be an even number thereof.

The invention can preferably be provided in ball bearing cages of different designs, for example in the form of sheet-metal cages or solid cages, of different materials, for example sheet steel, brass, light metal, sintered iron, fabric-reinforced laminate, and of different structural forms, for example in window cages, snap-type cages or riveted cages. It is particularly preferable for the ball bearing cages to be designed as a solid cage, in particular brass solid cage.

Furthermore, provision may be made to use the ball bearing cage according to the invention in an angular ball bearing, deep-groove ball bearing or spindle bearing. The ball bearing cage can be particularly preferably employed for use in a high-power rolling bearing for the mounting of a shaft revolving at a high speed, in particular in a turbocharger, a power plant or in a turbine, in particular gas turbine.

BRIEF DESCRIPTION OF THE DRAWINGS

Exemplary embodiments of the invention are described in more detail with reference to figures, in which.

DETAILED DESCRIPTION OF THE INVENTION

Figure 1:
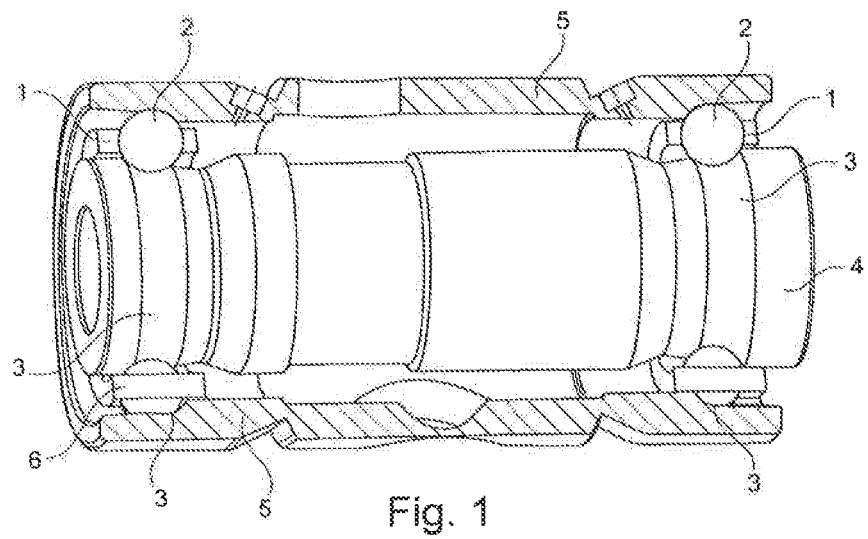
FIG. 1 shows a detail of a rolling bearing arrangement of a shaft mounting in a turbocharger according to an exemplary embodiment.

FIG. 1 shows a detail of a rolling bearing arrangement of a shaft mounting in a turbocharger. Said turbocharger has a turbine wheel. (not illustrated) which drives a compressor wheel (not illustrated) of the turbocharger via a rotatably mounted shaft 4. This high-speed shaft 4 is mounted via two angular ball bearings 1 which are arranged in an O-arrangement and support the shaft 4 in relation to a positionally fixed housing or bearing carrier 5.

The inner raceways 3 and the outer raceways 3 of the two angular ball bearings are provided directly in the shaft 4 or in the bearing carrier 5. The rolling bodies 2, in this case the balls 2, are arranged in two rows of balls between the respective inner raceway 3 and the associated outer raceway 3 of the two angular ball bearings 1.

In order to keep the balls 2 at a distance, the rows of balls of the two angular ball bearings 1 are each arranged in a solid cage 6, denoted below as a cage 6 in brief.

Figure 2:
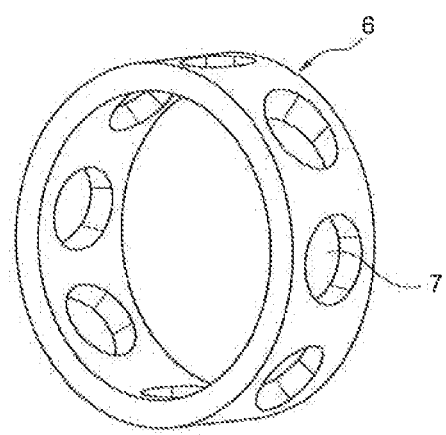
FIG. 2 shows a cage of a ball bearing according to an exemplary embodiment.

FIG. 2 illustrates the cage 6 of said angular ball bearing 1 in more detail. As FIG. 2 shows, the cage 6 has pockets 7 distributed over the circumference of the cage 6, in this case 8 pockets 7, for receiving the balls 2.

In this case, the pockets 7 are distributed asymmetrically over the circumference of the cage 6, i.e. the distances (21, 22, 23, 24, 21', 22', 23', 24') of the pockets 7, unlike conventional ball hearing cages, are not all identical, but rather vary.

Figure 3:
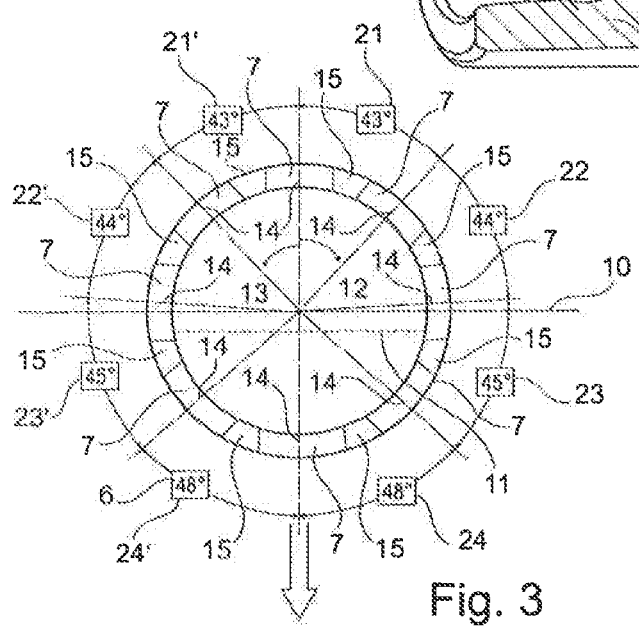
FIG. 3 shows a schematic illustration of a cage for clarifying an asymmetrical distribution of pockets and the effects thereof on the cage.

FIG. 3 shows, in a schematic illustration, this asymmetrical distribution of the pockets 7 of this cage 6.

As can be seen in FIG. 3, the cage 6 has 8 pockets 7 which are distributed over the circumference of the cage 6 and every two adjacent pockets 7 of which are separated by webs 15. In order to clarify and to describe the asymmetrical arrangement of the pockets 7, the cage 6 according to FIG. 3 is oriented in such a manner that a first pocket 7 or the pocket center thereof is in the zero or twelve o'clock position.

This first pocket 7 is followed in the clockwise direction 12 by a second, third and fourth pocket and a fifth pocket 7 which, or the pocket center of which, is located in the six o'clock position. A sixth, seventh and eighth pocket and, then again, the fifth pocket 7 follow counterclockwise, likewise beginning at the first pocket 7.

As FIG. 3 furthermore shows, the distance 21, in this case always stated as the (in between) circumferential angle, between the first and the second pocket 7 or the distance 21' between the first and the sixth pocket 7 is in each case 43°. The distance 22 between the second and the third pocket 7 or the distance 22' between the sixth and the seventh pocket 7 is in each case 44°. The distance 23 between the third and the fourth pocket 7 or the distance 23' between the seventh and the eighth pocket 7 is in each case 44°. The distance 24 between the fourth and the fifth pocket 7 or the distance 24' between the seventh and the fifth pocket 7 is in each case 48°.

In accordance with a described asymmetrical arrangement of the pockets 7, the cage 6 has axial symmetry with respect to a mirror axis which is defined by the pocket center of the first pocket 7, the center point of rotation of the cage 6 and the pocket center of the fifth pocket 7.

Furthermore, said asymmetrical distribution of the pockets 7 leads to the web width increasing, starting at the first pocket 7, both in the circumferential direction 12, and in the opposed circumferential direction 13, which, in comparison to conventional cages with pockets distributed identically over the circumference, leads to a displacement or accumulation of material and a mass displacement into or in the region of the fourth, fifth and seventh pocket 7.

As FIG. 3 also clarifies, this in turn leads, also in contrast to conventional cages, to the center line of the mass distribution 11 being displaced in the direction of said mass distribution and therefore deviating from the geometrical center line 10 of the cage 6.

A specific or controlled eccentricity and unbalance of the cage 6 is associated with said "asymmetrical" distribution of the pockets 7 over the circumference of the cage and with the specific asymmetrical mass distribution on the cage.

Said controlled eccentricity of the cage generates a defined force F 9 (unbalance F 9) in the revolving movement of the cage 6, which force can be described mathematically as follows and opposes the cage instabilities, $F=\omega^{2*}$cage mass*eccentricity (where $\omega$=revolving speed).

Figure 4:
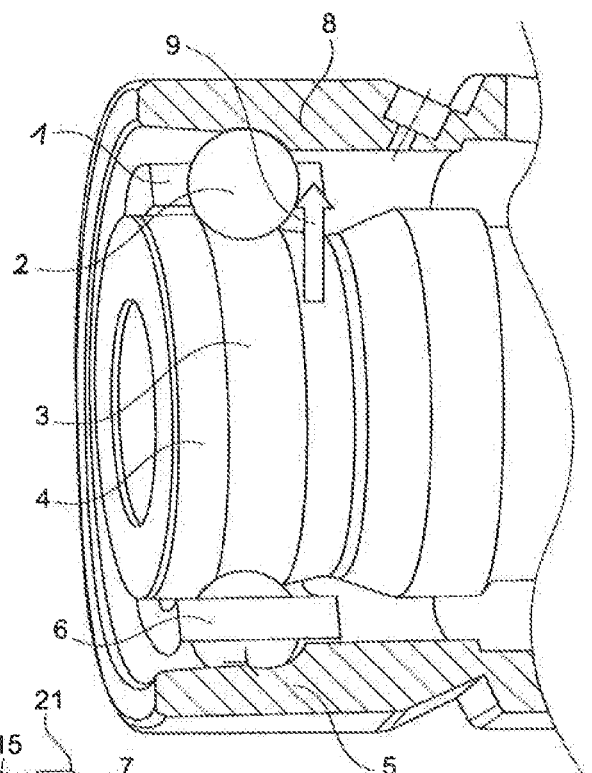
FIG. 4 shows a partial detail of the rolling bearing arrangement according to FIG. 1 in order to clarify the effect according to the invention of a mass eccentricity of the cage.

As FIG. 4 shows, during the revolving movement thereof, the cage 6 is positioned in a specific manner on the run-up surface 8 and thereby avoids the shock-like loading on the run-up surface 8.

REFERENCE NUMBERS

1 Angular Ball Bearing
2 Rolling Body, Ball
3 Raceway
4 Shaft
5 Bearing Carrier, Housing
6 Cage
7 Pocket
8 Run-Up Surface (of the Cage 6)
9 Force Vector resulting from the Mass Eccentricity
10 Geometrical Center Line
11 Center Line of the Mass Distribution
12 Circumferential Direction
13 Opposed Circumferential Direction
14 Pocket Center
15 Web
21-24 (Circumferential) Angle between two adjacent pockets 7
21'-24'(Circumferential) Angle between two adjacent pockets 7

The invention claimed is:

1. A ball bearing cage, comprising:
an annular rolling body retainer having ball pockets distributed over a circumference of the rolling body retainer in order to receive spherical rolling bodies,
wherein distances between two of the ball pockets that are adjacent to each other increase in a circumferential direction, starting at a smallest distance between the two pockets at least in a 180° circumferential sector,
the ball pockets including a first pocket, a second pocket, a first set of further pockets positioned between the first pocket and the second pockets in a first circumferential direction and a second set of further pockets positioned between the first pocket and the second pockets in a second circumferential direction, the cage having an axial symmetry with respect to a mirror axis defined by a center point of rotation of the cage, a pocket center of the first pocket and a pocket center of the second pocket such that each of the pockets of the first set is symmetrically aligned with one of the pockets of the second set,
each of the pockets being spaced from each of two adjacent pockets of the pockets by a web, each of the webs between the first pocket and the two adjacent pockets being the least wide of the webs, each of the webs of between the second pocket and the two adjacent pockets being the widest of the webs.

2. The ball bearing cage as claimed in claim 1, wherein the circumferential sector has distances that increase at an identical absolute amount.

3. The ball bearing cage as claimed in claim 1, wherein there are at least six ball pockets.

4. The ball bearing cage as claimed in claim 3, wherein there are at least eight ball pockets.

5. The ball bearing cage as claimed in claim 1, wherein the ball bearing cage is a sheet-metal cage.

6. The ball bearing cage as claimed in claim 5, wherein the sheet-metal cage is made of brass.

7. The ball bearing cage as claimed in claim 1, wherein the ball bearing cage is a window cage, a riveted cage or a snap-type cage.

8. An angular ball bearing or in a deep-groove ball bearing comprising the ball bearing cage as claimed in claim 1.

9. A high-power rolling bearing for mounting of a shaft revolving at a high speed comprising the ball bearing cage as claimed in claim 1.

10. The ball bearing cage as claimed in claim 1, wherein the ball bearing cage is a solid cage.

11. The ball bearing cage as claimed in claim 10, wherein the ball bearing cage is a metal cage, a fabric-reinforced laminate cage or a plastics cage.

12. The ball bearing cage as claimed in claim 11 wherein the ball bearing cage is a metal cage.

13. The ball bearing cage as claim in claim 12 wherein the metal cage is a brass cage, a steel cage or a sintered iron cage.

* * * * *